Oct. 1, 1935.   R. P. MAY   2,015,860
FILM REEL
Filed Oct. 6, 1931   2 Sheets-Sheet 1

INVENTOR
RUSSELL P. MAY
BY
ATTORNEY

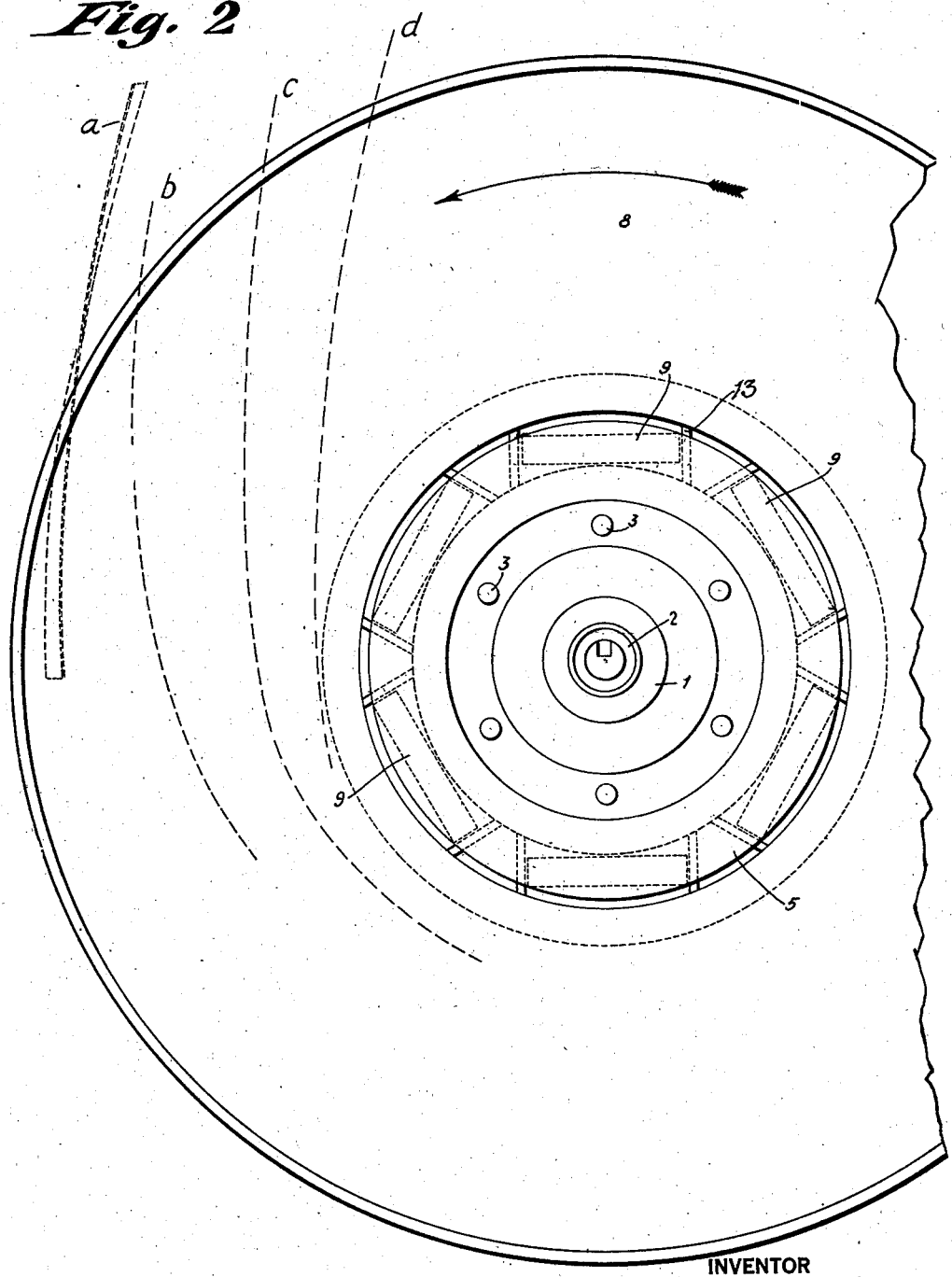

Patented Oct. 1, 1935

2,015,860

UNITED STATES PATENT OFFICE 2,015,860

FILM REEL

Russell P. May, Woodbury, N. J., assignor to Radio Corporation of America, a corporation of Delaware Application October 6, 1931, Serial No. 567,177

4 Claims. (Cl. 242—74)

This invention relates to film reels, particularly the type thereof used as take-up reels in motion picture apparatus and the like.

The purpose of this invention is to provide a reel which can be used on any conventional motion picture machine without auxiliary apparatus or attachments of any kind, and which will grasp, draw in and securely hold the film without the usual manual operations attendant upon connection of the film to the reel.

One object of the invention is to provide an improved reel capable of fitting in conventional motion picture machines.

Another object of the invention is to provide such a reel which is capable of cooperating with any standard width film without any special attachment on the end of the film or any special configuration of the end thereof.

Another object of the invention is to provide such a reel which does not damage the film in any way in grasping it and drawing it to the hub.

Another object of the invention is to provide such a reel which is capable of grasping, drawing in and securely holding the film without any mechanical film-catching means at the hub of the reel which would tend to damage the film.

Another object of the invention is to provide such a reel which avoids the necessity, common to other reels of this type, for a guide from the let-off sprocket to the reel hub.

Another object of the invention is to provide such a reel which needs no releasable guide to direct the film to the hub.

Another object of the invention is to provide such a reel which is entirely automatic in its operation and substantially fool-proof.

In the drawings:

Fig. 2 is a side view of the reel indicating a portion of the interior construction in dotted lines.

Figure 1:
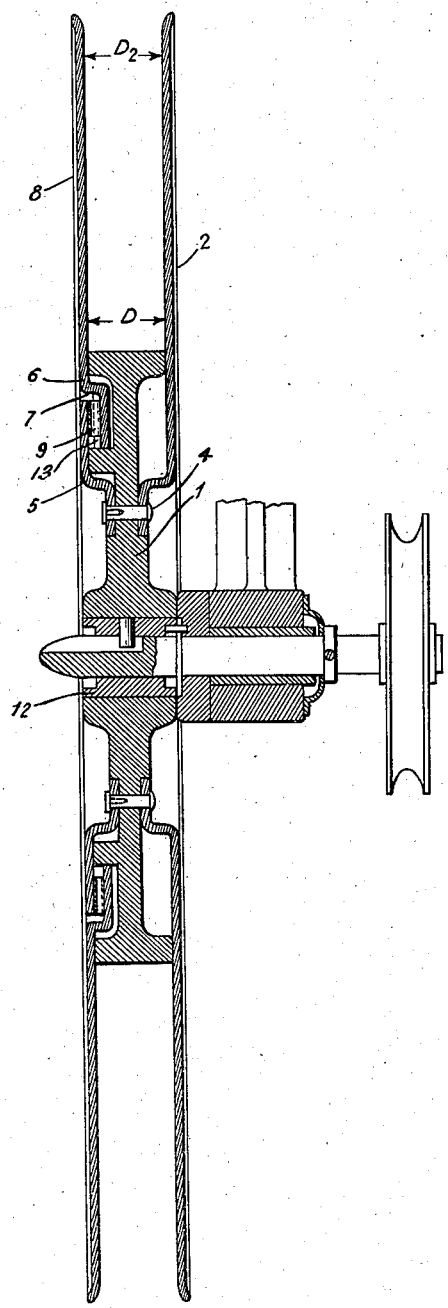
Fig. 1 represents a cross section of the reel as mounted on a conventionally-illustrated pick-up spindle.

The construction of the reel is as follows:

A hub member 1, which is preferably a diecasting of aluminum or other appropriate material, carries one flange 2 of the reel which is firmly affixed to the hub by the rivets 4.

To the other side of the hub, and also attached to the hub 1 by the rivets 4, is a rigid plate 5 which has a diameter considerably less than the periphery of the hub member which serves as a core for the reel of film. In one side of the hub member 1 is an annular recess 6 extending beyond the periphery of the member 5 and adapted to seat the annulus 7 which is integral with the member 8 constituting the other flange of the reel. This annular portion 7 is pressed into the recess 6 by the springs 9 so that, when the reel is empty, the space between the two flanges of the reel is determined by the thickness of the periphery of the core member and this thickness, and therefore this distance D, is made very slightly less than the width of the film to be wound upon the reel. The distance $D_2$ is made slightly greater than D and is almost but not quite the full width of the film.

The range of movement permitted by the springs 9 is sufficiently great so that with a single layer of film wound on the hub, the pressure exerted by the springs will not be too great.

The springs 9 are maintained in fixed position by the raised members 13 on the member 1, which members, as shown in Fig. 2, are spaced apart a distance slightly greater than the length of the spring to allow for movement at the ends of the spring when compressed.

The hub is provided with the usual axial bushing 12 having appropriate means to cooperate with the form of drive spindle which is to be used and the drive spindle is, as usual, driven through an appropriate friction means, such as a belt.

The operation of the device is as follows:

Assuming in Fig. 2 that the reel is rotating in a counter-clockwise direction as indicated by the arrow, the film is permitted to drop against the periphery thereof, whence it will naturally fall into a position somewhat as indicated at $a$ falling, due to its flexibility, between the flanges of the reel and with its surface not exactly perpendicular to the flanges. As the film is permitted to escape from the machine, and as the portion of the reel from the periphery of the core to the edge of the reel is driven in a direction indicated at a higher rate of speed than the travel of the film as is usual, the friction between the edges of the film and the flanges will tend to carry the film downward along the general curve of the reel. This will curve the film itself longitudinally and thereby prevent lateral curvature, whence the film will assume a position substantially perpendicular to the flanges along the line somewhat as indicated at $b$ pressing the flanges apart against the pressure of the springs 9.

Continued rotation of the reel at a speed greater than the rate of travel of the film will cause the film to follow the line of least resistance and move toward the more-slowly-rotating central portion of the reel as indicated at $c$, and this will continue until the film has reached a position tangentially to the hub as indicated at $d$.

When the film reaches the position $d$ and has made a complete turn around the hub, the flanges will be separated by the width of the film, and therefore cannot exert further pressure during the remainder of the operation thereby avoiding any unnecessary friction between the film and the flanges of the reel.

It will thus be seen that I have provided an automatic film reel which is simple and inexpensive and at the same time attains all of the objects set forth above, wherefore;

I claim:

1. A film reel comprising a core, a flange rigidly attached thereto, a second flange of smaller diameter than the core member and rigidly attached to the opposite sides thereof, a third flange extending beyond the core member and extending underneath said second flange, and springs between said latter two flanges pressing said third flange against said core member, the spacing between said first and third flanges at their peripheries being at least equal to their spacing adjacent to the core.

2. The method of winding film upon a core member comprising the step of grasping the film between the peripheries of two substantially flat continuous spool flanges separated a distance slightly less than the width of the film and which are driven at a speed greater than the speed of travel of the film.

3. The method of winding film upon a core member comprising grasping the film between the peripheries of two substantially flat continuous spool flanges separated a distance slightly less than the width of the film and which are driven at a speed greater than the speed of travel of the film, and permitting the film to advance, at less speed than the speed of said flanges, between said flanges.

4. The method of winding film upon a core member comprising rotating said core, rotating therewith a pair of flanges which are spaced from one another a distance slightly less than the width of the film, feeding film between said flanges at a speed less than their speed of rotation, bending said film by the friction thereof against said flanges, and causing the end of the film to travel toward the more slowly moving portion of the flanges adjacent to the core.

RUSSELL P. MAY.